(12) United States Patent
Matthys et al.

(10) Patent No.: US 7,278,746 B2
(45) Date of Patent: Oct. 9, 2007

(54) MOTORIZED BLEND ALIGNMENT TOOL

(75) Inventors: Geert Matthys, Haaltert (BE); Ludo Francois Victor Bruwier, Roeselare (BE)

(73) Assignee: Barco N.V., Kortrijk (BE)

( * ) Notice: Subject to any disclaimer, the term of this patent is extended or adjusted under 35 U.S.C. 154(b) by 368 days.

(21) Appl. No.: 11/101,588

(22) Filed: Apr. 8, 2005

(65) Prior Publication Data

US 2006/0227301 A1    Oct. 12, 2006

(51) Int. Cl.
G03B 21/14    (2006.01)
(52) U.S. Cl. .......................... 353/94; 353/97
(58) Field of Classification Search ............... 353/94, 353/97, 119; 348/745, 750, 751, 806, 841
See application file for complete search history.

(56) References Cited

U.S. PATENT DOCUMENTS

| | | | | |
|---|---|---|---|---|
| 6,017,123 | A * | 1/2000 | Bleha et al. ................... | 353/30 |
| 6,513,938 | B2 * | 2/2003 | Kubota et al. ................ | 353/94 |
| 6,570,623 | B1 | 5/2003 | Li et al. | |
| 6,590,621 | B1 * | 7/2003 | Creek et al. ................... | 349/5 |
| 6,637,887 | B2 * | 10/2003 | Yamanaka .................... | 353/30 |
| 6,886,943 | B1 * | 5/2005 | Greenberg et al. ............ | 353/94 |
| 2003/0227599 | A1 * | 12/2003 | Weissman et al. ............ | 353/94 |
| 2005/0083492 | A1 * | 4/2005 | Taubenberger ............... | 353/94 |
| 2005/0270499 | A1 * | 12/2005 | Ishii et al. .................... | 353/94 |

FOREIGN PATENT DOCUMENTS

| | | |
|---|---|---|
| FR | 2 774 481 | 8/1999 |
| WO | WO 95/25292 | 9/1995 |
| WO | WO95/25292 | 9/1995 |
| WO | WO 01/41455 A1 | 6/2001 |
| WO | WO 02/05553 | 1/2002 |

OTHER PUBLICATIONS

Patent Abstracts of Japan, vol. 2000, No. 12, Jan. 3, 2001 & JP 2000 241876 A (Hitachi Ltd), Sep. 8, 2000, abstract; figures 7, 8.

* cited by examiner

*Primary Examiner*—William C. Dowling
(74) *Attorney, Agent, or Firm*—Bacon & Thomas PLLC (57) ABSTRACT

A blending tool is described for blending sub-images of a multi-channel projection system comprising a plurality of projectors. The blending device typically has a number of adjustable optical blending means which each are adapted to be mounted on a projector of said multi-channel projection system. Using a removable controlling means allows automated controlling of at least one of the adjustable optical blending means, or a blending component thereof. The removable controlling means therefore has engaging means for temporary engaging the removable controlling means to the adjustable blending means. In a preferred version, the blending tool allows remote control of the adjustable blending means such that blending can be performed from the viewing side of the projection system, even for rear-projection systems. Furthermore a method for blending and projection systems adapted for being blended using the blending tool are provided.

25 Claims, 9 Drawing Sheets

MOTORIZED BLEND ALIGNMENT TOOL

TECHNICAL FIELD OF THE INVENTION

The present invention relates to the field of multi-channel display systems and image projectors. More particularly, the present invention relates to blending tools and methods for creating a seamless composite image in multi-channel display systems based on a number of projectors.

BACKGROUND OF THE INVENTION

Multi-channel arrangement projection systems are projection systems projecting a composite image which is subdivided in two or more sub-images each projected by means of a separate projector element, the sub-images being tiled in such a way that together they form a bigger image. The advantage of this method of projection is that the field of view can be increased while maintaining a high image resolution and that a system with small footprint can be used for projecting large images. This kind of large field of view projection systems serve different broad areas of application: electronic presentations, e.g. for business, education and advertising; entertainment applications, e.g. home theatre, electronic cinema; status and information presentations, e.g. military, utilities, transportation; simulation applications in e.g. training and games.

Figure 1:
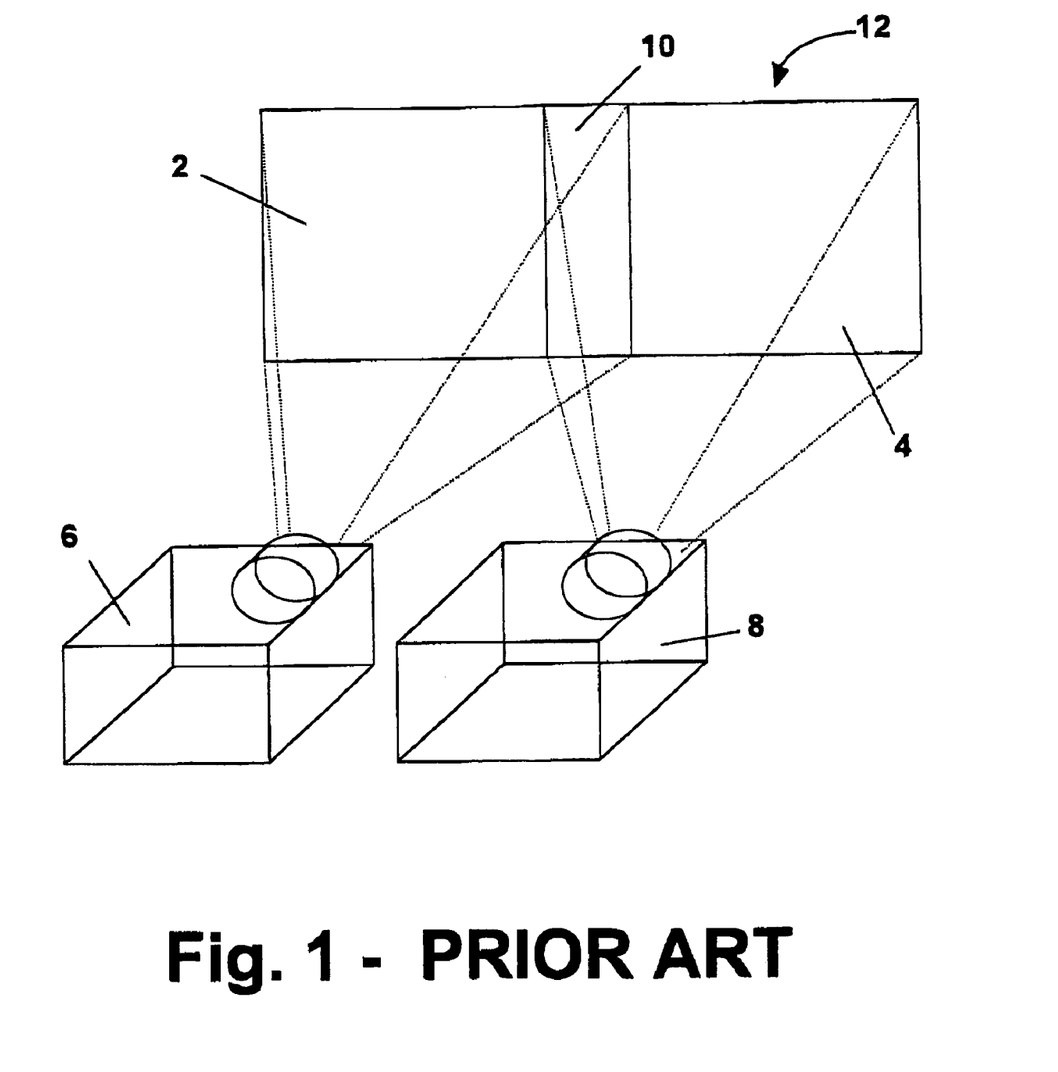
FIG. 1 illustrates the known principle of soft edge blending of two adjacent images projected onto a display screen by two adjacent projectors.

When tiling sub-images of a tiled image, e.g. projected from a multi-channel projection system, hard edge or soft edge techniques can be applied. Where hard edge techniques are applied, the projected sub-images are put next to each other. This is often not an optimal solution because the edges between the sub-images are difficult to arrange in perfect alignment and the join may well be noticeable. Where soft edge techniques are applied, an overlap area is created in which two or more neighboring sub-images, i.e. at least a first sub-image and second sub-image, are blended so that there is at least a gradual transition from the first sub-image to the second sub-image. Therefore the first sub-image is progressively spatially faded out whilst the second sub-image is progressively spatially faded in. The principle of soft edging is illustrated by means of FIG. 1. In FIG. 1, a first sub-image 2 and a second sub-image 4 are projected by means of a first projector 6 and a second projector 8, respectively, in such a way that an overlap area 10 is created in the image 12 formed by the first sub-image 2 and the second sub-image 4 on the screen, namely in the area which is illuminated by more than one projector, in the present case by the first projector 6 and the second projector 8. In case of a good soft edge, the first and second sub-images 2, 4 are processed, optically or electrically, in such a way that the sum of the light intensity in the overlap area 10 is equal to the average intensity outside the overlap area 10, and in such a way that the contribution of the first projector 6 to this total intensity in the image 12 changes gradually from maximum to zero from a first side of the overlap area 10 to a second side of the overlap area 10, while the contribution of the second projector 8 to this total intensity changes gradually from zero to maximum from the first side of the overlap area 10 to the second side of the overlap area 10.

Two types of soft edge techniques or blending techniques are known: electrical blending and optical blending. The use of electrical edge blending is known in the industry and is widely used in cathode ray tubes (CRT), digital light processing displays (DLP™), liquid crystal displays (LCD) and other projection display technologies. The advantages of electrical blending are known: real time control, dynamically changeable based upon imagery or changes in the system configuration, flexible attenuation curves of any type can easily and simply be defined. Nevertheless, electronic blending typically suffers from "double black" errors, i.e. whereby the combination of light leakages in an overlapping blend region leads to a black level having an intensity that is twice the level of the black level in non-overlapping areas.

Optical blending, using optical masks either with hard edges, dither patterns, or gradient patterns of some kind whereby the devices are placed either internally or externally to the projectors to cause smooth transitions in blend regions to produce a satisfactory blend also are known. Such systems are described for example in WO 95/25292 and WO 01/41455. Optical blending systems do not suffer from the "double black" problem and offer an acceptable blend at all brightness levels from white to black, which often makes it the most preferable blending technique. Nevertheless, changes to the blend regions e.g. for the purposes of changes in display configuration are not possible without articulated mechanical systems.

Adjustment of the blending of sub-images in a multi-channel projection system typically is performed only during set-up and calibration of a multi-channel projection system or during maintenance. Typically each optical blending means needs to be adjusted with respect to its neighbors, whereby an optimized result is obtained by an iterative adjustment. The latter thus requires that at each projector the blending means is positioned optimally, which is time-consuming. Furthermore, in many of today's systems, adjustment of optical blending is performed manually, making it very tedious and labor-intensive. As evaluation of the quality of the blend preferably is performed viewing the viewing side of the screen—the rear-side typically has a different emission characteristic—blending adjustment typically requires more than one person.

SUMMARY OF THE INVENTION

It is an object of the present invention to provide methods and systems, e.g. tools, for efficiently calibrating and/or adjusting and/or optimizing the blending of sub-images in a multi-channel projection system. It is also an object of the present invention to provide methods and systems, e.g. tools, allowing more facilitated calibrating and/or adjusting and/or optimizing blending of sub-images in a multi-channel projection system. Still another object of this invention is to provide methods and systems, e.g. tools, for calibrating and/or adjusting and/or optimizing the blending of sub-images in a multi-channel projection system which have a low economical and manufacturing cost. Yet another object of the present invention is to provide a method and systems, e.g. a tool, for calibrating and/or adjusting and/or optimizing the blending of sub-images fully applicable by a single person. It is also an object of the present invention to provide projection systems adapted for applying methods and systems for calibrating and/or adjusting and/or optimizing the blending of sub-images of such systems.

The above objectives are accomplished by the methods and systems according to the present invention.

In a first aspect, the present invention provides a blending device for blending sub-images projected by a plurality of projectors into a larger image. The blending device comprises a plurality of adjustable optical blending means, each of said adjustable optical blending means adapted to be mounted on a projector of said plurality of projectors, and removable controlling means for automated controlling at least one of said plurality of adjustable optical blending means, said removable controlling means comprising engaging means adapted for temporary engaging with said at least one adjustable optical blending means.

It is an advantage that the controlling means of the blending device is removable, thus allowing re-use of this part for different parts of the projection system that is calibrated, as well as re-use of this part for a plurality of projection systems. The latter results in a lower manufacturing and economical cost. It thereby is an advantage that the calibration can be done in an automated, e.g. motorized, way, thus reducing the time needed for calibrating a multi-projector system. Furthermore, the calibration can be carried out by a single person.

The removable controlling means may be adapted for being remotely driven. The remote drive may comprise any of infrared remote controlled, computer driven through wireless connection, computer driven through Ethernet, remote sensing or computer driven through wired connection. The removable controlling means being remotely driven results in a more easy calibration of the screen, as it can be done by a single person from the emissive side (i.e. viewing side for the user) of the screen whereon the image is projected. As screens have different characteristics at the emissive and non-emissive sides, it is better to get a feed-back for blending from the emissive side.

Each of said adjustable optical blending means may comprise at least one blending component. Preferably said adjustable optical blending means comprises at least two blending components. An optical blending means with only one blending component may be useful for an edge element of a 1×N projection system.

Each of said at least one blending components is moveable in a plane substantially perpendicular to an optical axis of a projection lens of a projector of said plurality of projectors, wherein each of said blending components can be moved according to at least one degree of freedom. The different degrees of freedom may be movement in a first direction, e.g. x-direction, movement in a second direction perpendicular to said first direction, e.g. y-direction, movement in a third direction, perpendicular to both said first and said second direction or tilting out of the plane determined by the first and the second direction. The blending component may be moveable according to two degrees of freedom, or even according to three degrees of freedom.

Said removable controlling means for controlling at least one of said plurality of adjustable optical blending means may comprise at least one driving means for imparting motion to said at least one blending component of said at least one of said plurality of adjustable blending means, through said engaging means. Said driving means for imparting motion may be any of a DC motor, an encoded motor or a stepper motor. The use of such driving means is advantageous as it provides a very accurate alignment of the blending means, as e.g. several turns of a motor may provide only a very small movement of the blending means. It is furthermore an advantage that the driving means is not part of the adjustable optical blending means, as this allows re-use of the driving means and as this reduces the strain/stress and environmental influence on the adjustable optical blending means. The latter is obtained, amongst others, because the weight of the adjustable optical blending means is reduced, while still being able to have automated, e.g. motorized, control during calibration.

Said removable controlling means may comprise a transferring means for transferring the motion imparted by said driving means to said engaging means. Motion imparted by said driving means can in this way be transferred to said adjustable optical blending means or, more particularly, to a component thereof.

In a blending device according to the present invention, said blending device may furthermore comprise a feed-back means for providing feed-back to said removable controlling means about said blending obtained by said automated controlling said at least one blending component of said at least one of said plurality of adjustable optical blending means.

Furthermore, said blending device may be adapted for providing a test signal to said projector or a control signal to an image generator adapted for providing said sub-image to said projector.

The removable controlling means may provide specific positions of said at least one blending component of said at least one of said plurality of adjustable optical blending means, said specific positions characterized by a number of settings, wherein said blending device furthermore is adapted for outputting and/or storing said settings.

In embodiments of the present invention, the removable controlling means may be adapted for simultaneously engaging with and/or controlling of at least two, preferably at least four, adjustable optical blending means, said adjustable optical blending means mounted on adjacent projectors.

In a second aspect, the present invention provides a projection system for projecting a multi-channel image, formed by a plurality of sub-images, the projection system comprising a plurality of projectors, wherein said projection system comprises for each of said plurality of projectors, an adjustable optical blending means mounted on said projector. The adjustable optical blending means is adapted for being automatedly controlled using a removable controlling means adapted for temporary engaging with at least one of said adjustable optical blending means.

In embodiments of the present invention, said adjustable optical blending means comprises at least one blending component. Each of said at least one blending components may be movable in a plane substantially perpendicular to an optical axis of a projection lens of the projector onto which the blending means is mounted.

In embodiments of the present invention, said projection system may furthermore comprise a means for electronically blending said plurality of sub-images.

In a third aspect, the present invention provides a method for blending sub-images generated by a multi-channel projector system. The method comprises connecting removable controlling means to at least one of a plurality of adjustable optical blending means, each mounted on a corresponding projector; controlling said at least one of a plurality of adjustable optical blending means in an automated way using said removable controlling means so as to blend sub-images of said corresponding projector; and removing said removable controlling means from said adjustable optical blending means.

Said method may furthermore comprise, prior to said connecting of the removable controlling means, mounting an adjustable optical blending means to each of a plurality of projectors.

The projection system may be a rear-projection system providing an image to a rear side of a screen, in which case in particular the controlling may comprise remotely controlling said at least one of a plurality of adjustable optical blending means from a viewing side of said screen.

In embodiments of the present invention said controlling may comprise controlling of at least two, preferably at least four, adjustable optical blending means simultaneously in an automated way.

In embodiments of the present invention, said adjustable optical blending means may comprise at least one blending component, wherein said controlling may comprise moving at least one blending component in a plane substantially perpendicular to an optical axis of a projection lens of said projector.

In embodiments of the present invention, the method may furthermore comprise providing test sub-images to said projection system.

In embodiments of the present invention, controlling may furthermore comprise obtaining feedback about said blending sub-images of said corresponding projectors.

In embodiments of the present invention, said method may furthermore comprise outputting and/or storing settings of said at least one adjustable blending component of at least one of said plurality of adjustable optical blending means obtained during said controlling of said at least one of a plurality of adjustable optical blending means in an automated way.

In embodiments of the present invention, said method may furthermore comprise obtaining settings of at least one of said blending components of said at least one of said plurality of adjustable optical blending means and said controlling may be based on said obtained settings.

Although there has been constant improvement, change and evolution of devices in this field, the present concepts are believed to represent substantial new and novel improvements, including departures from prior practices, resulting in the provision of more efficient and reliable devices of this nature. The teachings of the present invention permit the design of improved methods and apparatus for providing blending of sub-images in a multi-channel projection system, as well as the design of projection systems adapted for being calibrated using said blending methods and apparatus.

Other features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DESCRIPTION OF THE PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the present invention methods and systems for calibrating, optimizing and/or adjusting an optical blend of sub-images of a projection system are described. Projection may be carried out on any suitable kind of screens, such as for example front projection or back projection screens, having any suitable shape, such as for example curved or straight screens. The methods and systems are especially useful for rear-projection systems, as in principle calibrating and/or optimizing, and/or adjusting is harder to perform for such systems. The systems and methods of the present invention are related to blending of regions were images overlap.

Figure 2:
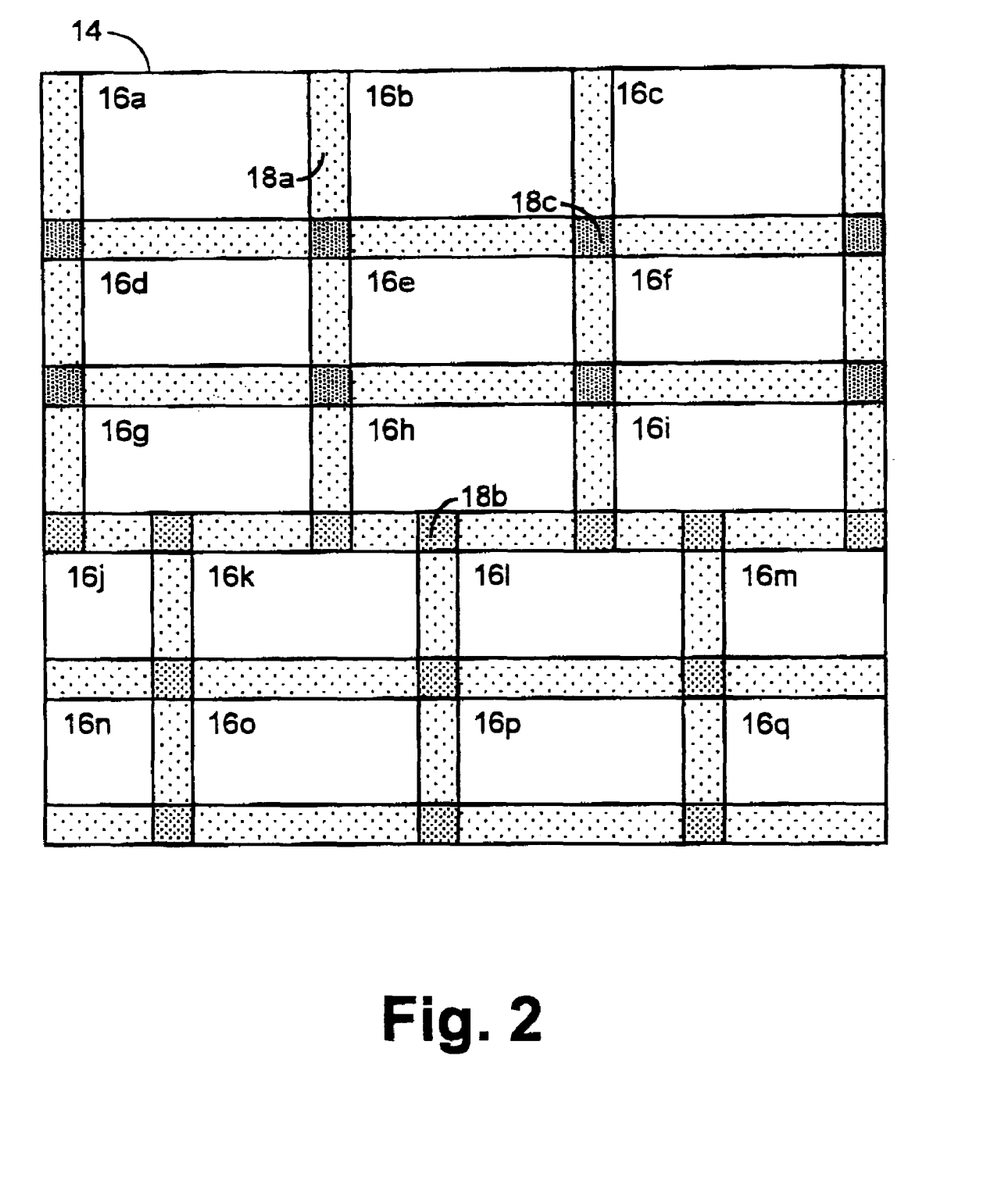
FIG. 2 illustrates blending areas in a projected image comprising a large number of sub-images.

FIG. 2 shows an image 14 projected onto a display surface such as a display screen by means of a plurality of projection devices (not represented in the drawing). The image 14 comprises a large number of sub-images 16a, 16b, 16c, 16d, . . . 16p, 16q and a number of blending areas 18a, . . . , 18c, i.e. areas on the display screen that are illuminated by more than one projection device. The blending areas 18 consist of the overlap, or a portion of the overlap, of at least two sub-images. In the example represented in FIG. 2, these blending areas 18 can consist of the overlap, or a portion of the overlap, of two sub-images 16, e.g. blending area 18a which is the overlap area of sub-images 16a and 16b and which also can be referred to as a 2-overlap region; the overlap, or a portion of the overlap, of three sub-images 16, e.g. blending area 18b which is the overlap area of sub-images 16h, 16k and 16l and which also can be referred to as a 3-overlap region; or the overlap or a portion of the overlap of four sub-images 16, e.g. blending area 18c which is the overlap of sub-images 16b, 16c, 16e and 16f and which also can be referred to as a 4-overlap. Neither the total number of sub-images 16 in the projected image 14, nor the size of the projected image 14, nor the arrangement or the size of the different sub-images 16 is limiting for the methods and systems for blending or calibration, optimization and/or adjustment thereof, according to the present invention.

Figure 3:
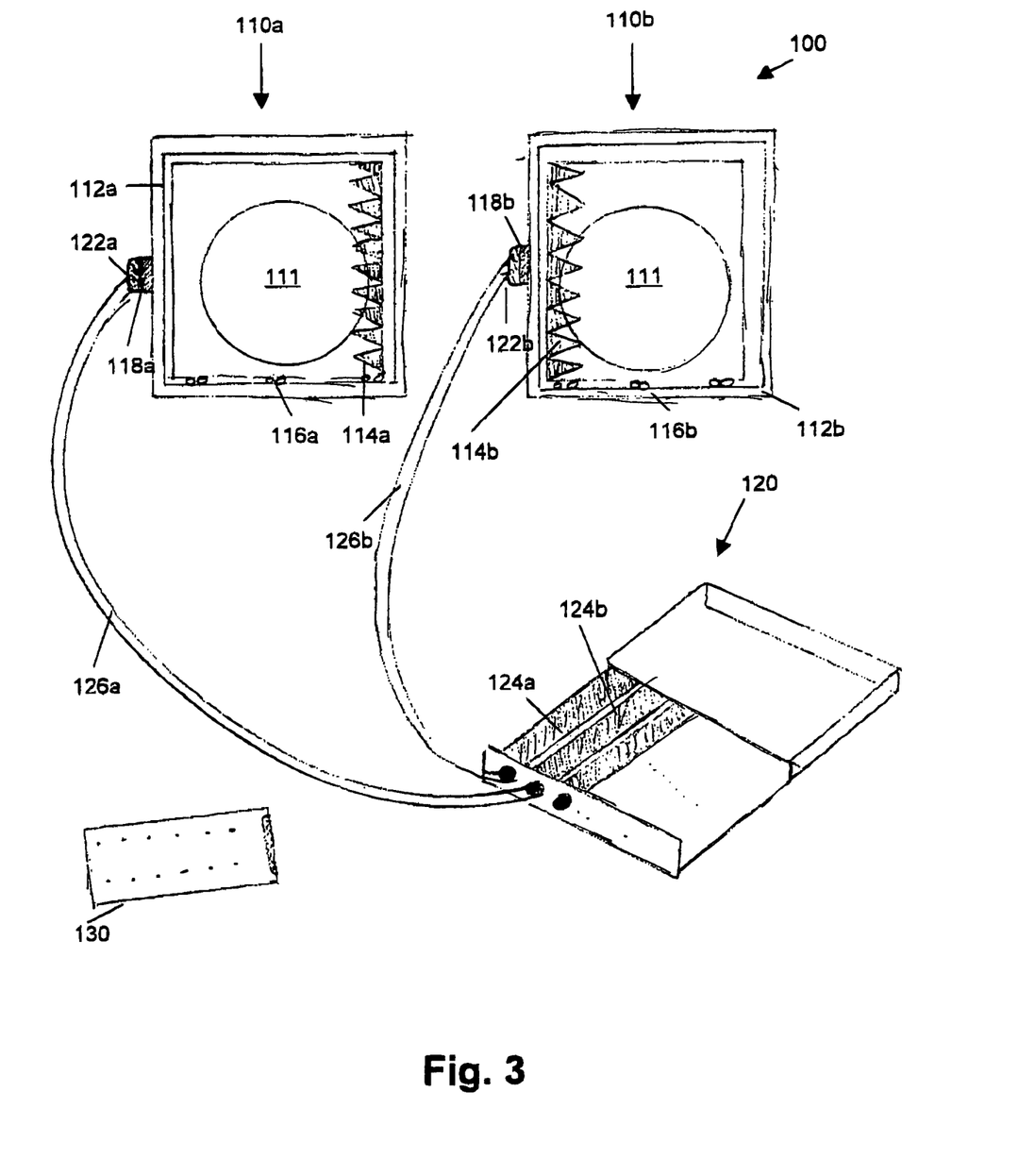
FIG. 3 illustrates a blending tool with adjustable optical blending means and a removable controlling means according to a first embodiment of the present invention.

In a first embodiment, the present invention relates to a blending method and blending tool for calibrating and/or optimizing and/or adjusting of the blending of sub-images in a multi-channel projection system. This calibrating, optimizing and/or adjusting can be performed in an automated way. The latter does not per se mean that no intervention is needed for controlling the blending means, but it implies that driving means, such as e.g. a DC motor or a stepper motor, are used instead of a complete manual control of the blending means. An example of an automated blending tool according to an embodiment of the present embodiment is shown in FIG. 3. A blending tool 100 according to the present invention comprises a plurality of adjustable optical blending means 110a, 110b which are adapted to each be mounted on a channel of a multi-channel projection system and a removable controlling means 120 for controlling the plurality of adjustable optical blending means 110a, 110b. The removable controlling means 120 thereby is adapted to be temporarily engageable to each of said plurality of adjustable optical blending means 110a, 110b with engaging means 122a, 122b. In FIG. 3, some adjustable optical blending means 110a, 110b with reference to projection lenses 111 are shown, the blending tool 100 not being limited to the number of adjustable optical blending means 110a, 110b shown in the drawing and furthermore, the multi-channel projection system with the projectors not being part of the blending tool 100. The multi-channel projection system, to which the adjustable optical blending means 110a, 110b can be mounted, may e.g. be a multi-projector projection system. The multi-projector system may consist of m rows by n columns of projectors, i.e. m×n projectors. As was shown in FIG. 2, this may create 4-overlap regions, being an overlap both in horizontal and vertical direction. The system may be a passive stereo projection system, whereby for each sub-image two projectors are used. The projection system then comprises 2×m×n projectors. The different components of the blending tool will now be described in more detail.

The plurality of adjustable blending means 110a, 110b typically may comprise a number of adjustable blending means 110a, 110b that is equal to the number of channels of the multi-channel projection system for which it will be used, e.g. equal to the number of projectors that is present in the multi-channel projection system for which the blending tool will be used, although the invention is not limited thereto. It may be chosen to not blend certain, i.e. a number but not all, projection channels of the projection system or to blend a number but not all projection channels of the system using another blending system. The latter could e.g. be a fixed blending means or electronic blending means, as well known by a person skilled in the art. The plurality of adjustable blending means 110a, 110b, being at least one adjustable blending means, more preferably at least two adjustable blending means, even more preferably at least four adjustable blending means, consists of adjustable optical blending means wherein blending is performed optically. The latter is advantageous as it results in blending that does not suffer from the "double black" problem as set out above.

Such adjustable optical blending means 110a, 110b typically optically block and/or attenuate part of the beam projected by a projector. The adjustable optical blending means 110a, 110b may be placed inside or outside a channel of the multi-channel projection system and typically comprises a frame 112a, 112b and at least one blending component 114a, 114b, e.g. a soft edge mask or soft edge plate, that is projected in an out-of focus mode. Such blending components 114a, 114b may e.g. be soft edge masks having a transparent area, an opaque area and intermediate semi-transparent area made by a discrete pattern of black and transparent areas, soft edge masks being neutral density filters, wherein the absorbance shows a gradient over the soft edge mask, self supporting soft-edge masks comprising only opaque regions, programmable soft-edge masks such as e.g. masks based on liquid crystal displays, the invention not being limited thereto. Soft edge masks typically show a gradient transmission behavior, which will allow to attenuate the emission intensity at the edge of a sub-image from its full intensity to zero intensity. Soft edge masks being programmable soft-edge masks e.g. based on liquid crystal displays are such that a gradient transmissivity can be obtained by setting e.g. liquid crystal pixels, thus appropriately allowing to attenuate the light differently with different liquid crystal pixels. Especially the use of bi-stable liquid crystal displays may be useful, as these do not require to be continuously driven, as they keep their state after they have been set. For the sake of simplicity, further description will be given with reference to soft edge masks that are not programmable, their adjustability being caused by changing their physical position, although the invention is not limited thereto. Non-programmable soft edge masks, such as e.g. those based on an intermediate semi-transparent area with a discrete pattern or those comprising only an opaque region, may have a saw tooth pattern, a rounded pattern, a step pattern, etc. When the soft edge mask is based on dither patterns, e.g. a checkerboard pattern with varying opacity, the pattern is preferably chosen such that occurrence of ghost images by diffraction at the pattern is avoided. A more detailed description of soft edge masks and methods for making them can be found in patent application WO 0141455 from Barco N. V.

The optical blending means 110a, 110b is adapted to be placed in the optical configuration of a channel of the multi-channel projection system either on the illumination side or on the image forming side, i.e. in the optical path. Preferably each of the adjustable optical blending means 110a, 110b are adapted to be mounted at the output side of a channel of the multi-channel projection system as this allows an easier mounting. When mounted, the adjustable optical blending means typically 110a, 110b are positioned relative to the optical components of the projectors, i.e. with the optical components, e.g. projection lens, as a reference point. The mounting means used may be any suitable mounting means such as—but not limited to—glue, screws, clips, etc. The adjustable optical blending means 110a, 110b thus are mounted such that for each adjustable optical blending means 110a, 110b the frame 112a, 112b has a fixed position with reference to the optical components of the corresponding channel of the multi-channel projection system.

Figure 4:
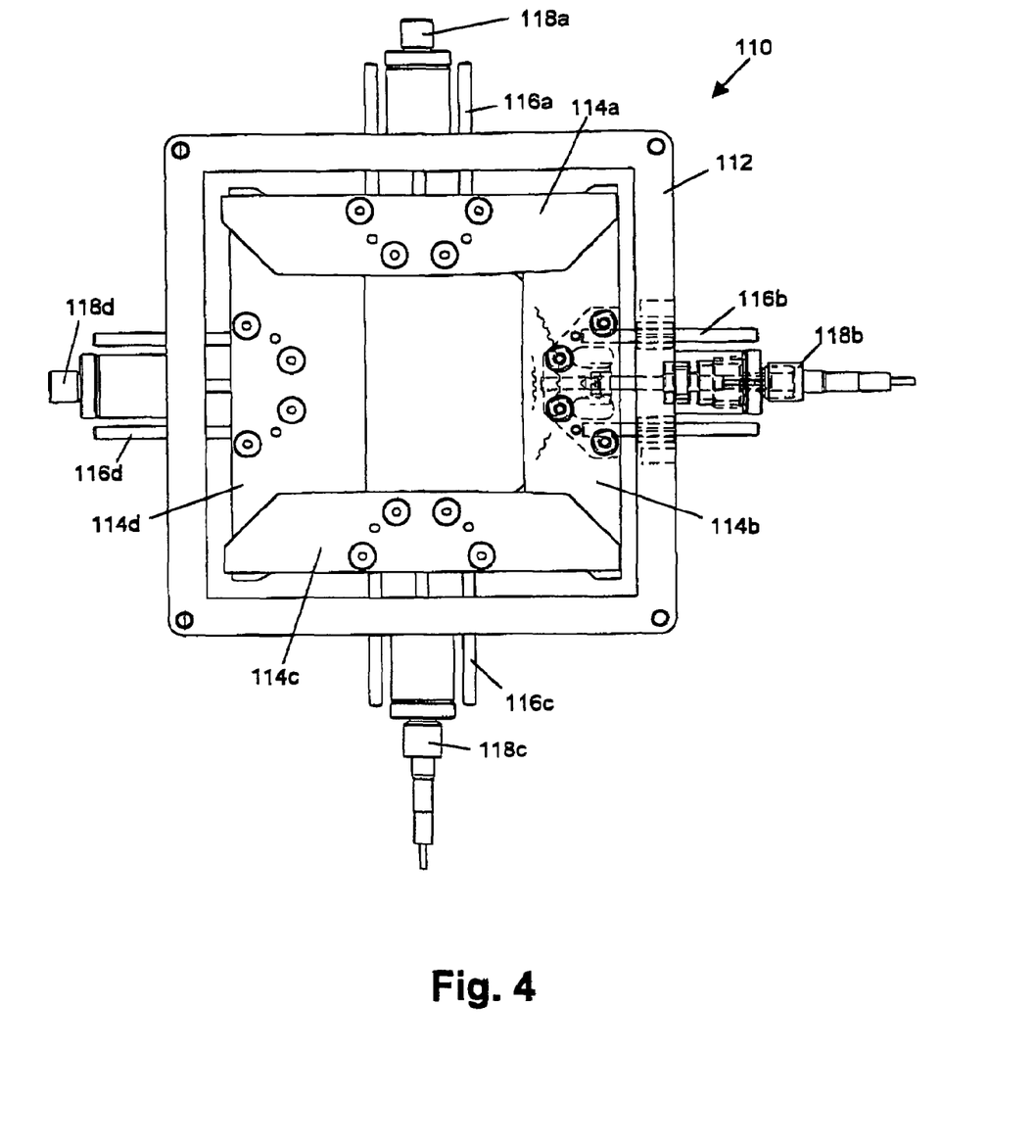
FIG. 4 illustrates a more detailed view of an exemplary adjustable optical blending means according to the first embodiment of the present invention.

In FIG. 4, a more detailed view of an exemplary adjustable optical blending means 110 is shown, the invention not being limited thereto. It shows a frame 112 and a number of blending components 114a, 114b, 114c, 114d. FIG. 4 shows an example wherein controlling or adjusting the adjustable optical blending means 110 can be performed by moving blending components 114a, 114b, 114c, 114d. The blending components 114a, 114b, 114c, 114d are provided such that they are moveable with respect to the frame 112. In order to increase the accuracy by which the movement of the blending components 114a, 114b, 114c, 114d can be controlled, the blending components 114a, 114b, 114c, 114d preferably are provided with means for fluently moving with respect to the frame 112, such as e.g. sliding means or guiding means 116a, 116b, 116c, 116d like a sliding/guiding groove, rollers, etc. Movement of the blending components 114a, 114b, 114c, 114d will be provided by driving means (not shown in FIG. 4), which typically are part of the removable controlling means of the blending tool. In order to transfer motion imparted by the driving means, the adjustable optical blending means 110 or the blending components 114a, 114b, 114c, 114d thereof typically are provided with engaging means 118a, 118b, 118c, 118d for connecting the removable controlling means 120 to the blending components 114a, 114b, 114c, 114d of the adjustable optical blending means 110.

Figure 5:
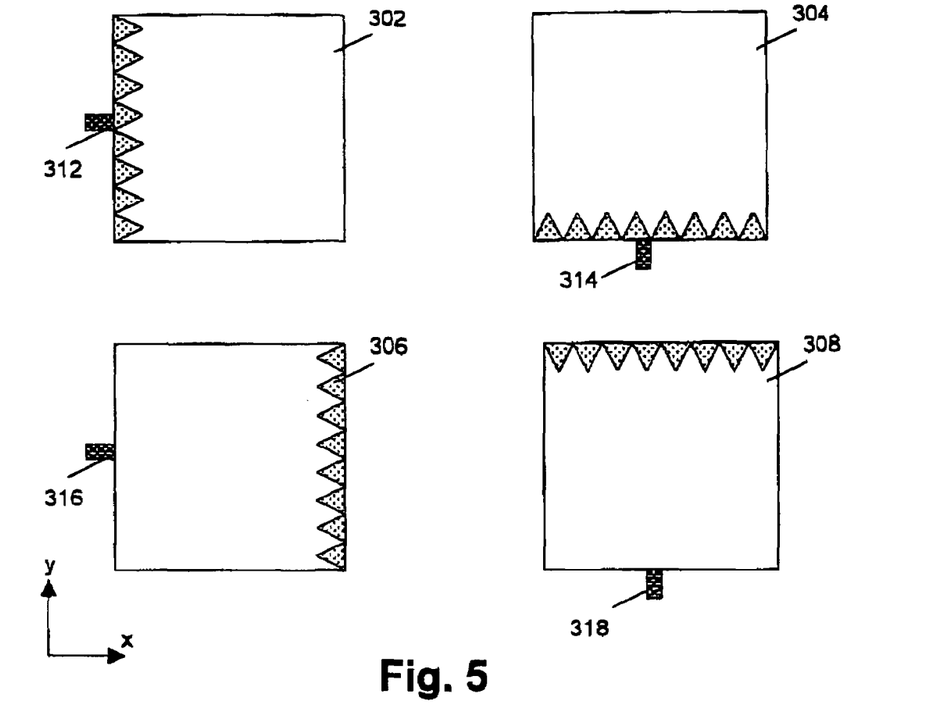
FIG. 5 and FIG. 6 illustrate some exemplary blending components for an adjustable optical blending means according to the first embodiment of the present invention.
Figure 6:
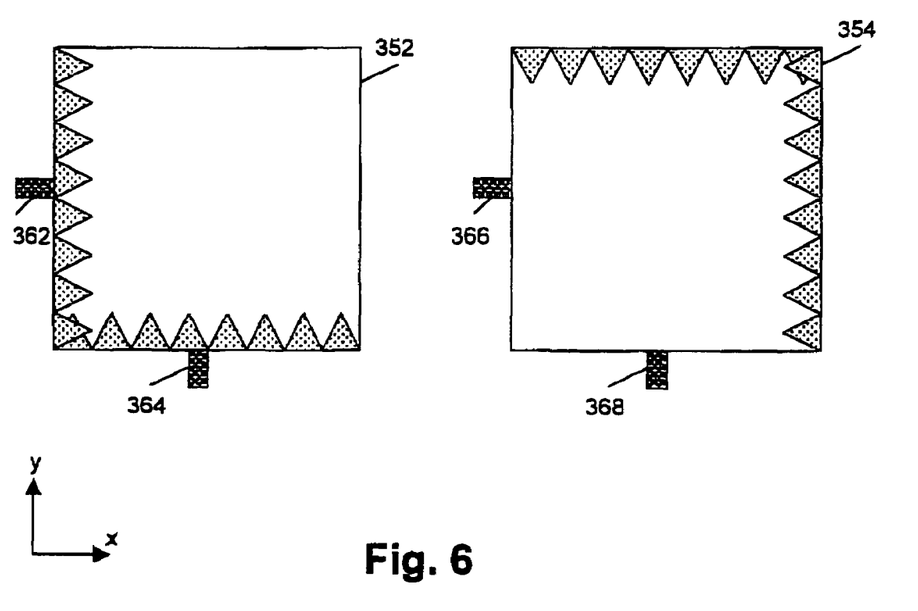

By way of illustration, the invention not being limited thereto, in FIG. 5 and FIG. 6, different types of blending components for a single adjustable optical blending means 110a, 110b are shown. FIG. 5 shows four blending components 302, 304, 306, 308 which can be all introduced in a single adjustable optical blending means 110a, 110b thus allowing blending on four sides of a sub-image. Each of the blending components 302, 304, 306, 308 thereby typically is driven separately, e.g. optical blending components 302, 306 in x-direction direction, and blending components 304, 308 in y-direction. The engaging means 312, 314, 316, 318 for engaging with the removable controlling means 120 are provided on the blending components 302, 304, 306, 308. FIG. 6 shows two blending components 352, 354 which, when incorporated in a single adjustable blending means also allow blending of four edges of a sub-images, if each component 352, 354 is driven in two ways, e.g. such that movement in x-direction and y-direction of each component 352, 354 is possible. The engaging means 362, 364, 366, 368 for connecting to driving means for creating such movement are also indicated.

In general, the blending components 114a, 114b will be adapted such that they are moveable and/or controllable at least in one first direction in a plane substantially perpendicular to the optical axis of a projection channel of the multi-channel projector. Each blending component 114a, 114b thus can be moved and/or controlled according to at least one degree of freedom. If more than one degree of freedom can be controlled, movement or control in a second direction in the plane substantially perpendicular to the optical axis of a projection channel of the multi-channel projection may be performed, the second direction e.g. being perpendicular to the first direction. Movement of the blending components in the plane substantially perpendicular to the optical axis of the projection channel typically is most efficient to adapt the corresponding blending. Furthermore, optionally movement in the direction of the optical axis of a projection channel of the multi-channel projection or tilting out of the plane perpendicularly thereto may be performed. The latter allows further fine-tuning.

Preferably, the number of blending components 114a, 114b in the adjustable optical blending means 110a, 110b is such that all edges of the sub-image can be controlled for blending, although the invention is not limited thereto. Furthermore, for a single sub-image edge, more than one blending component 114a, 114b may be used. It is to be noted that for programmable soft-edge masks, adjusting will imply rewriting of the pixels of the mask and the engaging means will be means for transferring writing signals to the pixels.

The removable controlling means 120, an embodiment of which is as shown in FIG. 3, is provided with engaging means 122a, 122b for allowing at least temporary engagement to at least one adjustable optical blending means 110a, 110b, and more particularly, to at least one blending component 114a, 114b thereof. The removable controlling means 120 provides at least one driving means 124a, 124b for imparting motion to a blending component 114a, 114b of an adjustable optical blending means 110a, 110b. These driving means allow automated control of the adjustable optical blending means 110a, 110b or blending components 114a, 114b thereof. The at least one driving means 124a, 124b may be any number of driving means 124a, 124b. Preferably, the number of driving means 124a, 124b may be such that it allows, for each overlap region separately, to control all blending components 114a, 114b by which the overlap region can be influenced. The number of driving means 124a, 124b can on the upper side be restricted to reduce the number of components needed in the removable controlling means 120. In other words, the number of driving means 124a, 124b preferably is such that, when using the blending tool 100, for a selected overlap region, a driving means 124a, 124b can be engaged to each of the relevant blending components 114a, 114b which can influence the blending in the overlap region. The type of driving means 124a, 124b used depends on the blending components used.

For soft-edge masks based on fixed light blocking areas, the driving means 124a, 124b may be driving means 124a, 124b for imparting motion to the blending components 114a, 114b. Such driving means 124a, 124b may e.g. be any suitable type of motor, such as e.g. a standard low cost motor, e.g. a DC motor, an encoder motor, all types of stepper motors. A typical displacement that is provided for the blending components may e.g. be 10% of the lens diameter. According to the present invention, displacement of the blending components may be performed very accurately, as e.g. a few turns of a motor may correspond to only a very small amount of linear movement of the blending components, e.g. 1 mm or less, a few μm.

The removable controlling means 120 for controlling the adjustable optical blending means 110a, 110b, or more particularly, the blending components 114a, 114b thereof, furthermore typically may comprise transferring means 126a, 126b for transferring the control signal provided by the driving means 124a, 124b to the engaging means 122a, 122b, by which the removable controlling means 120 is adapted to be connected to the adjustable optical blending means 110a, 110b or its blending components 114a, 114b, or more particularly to the engaging means 118a, 118b.

In case of soft-edge masks based on fixed light blocking areas, which can be controlled by imparting motion thereto, the transferring means 126a, 126b may be any means allowing to transfer the motion from the driving means 124a, 124b to the engaging means 122a, 122b. A possible example thereof, the invention not being limited thereto, may be a stiff wire providing similar motion on a second end of the wire as the motion imparted on a first end of the wire. Such wires may e.g. be wires similar to those used in brakes of bicycles. It is an advantage that the driving means 124a, 124b are not part of the adjustable optical blending means 110a, 110b or its blending components 114a, 114b, as this allows to reduce the number of driving means 124a, 124b necessary because the same driving means 124a, 124b can be used for different blending components 114a, 114b. Keeping the driving means 124a, 124b separate from the adjustable optical blending means 110a, 110b furthermore allows to use the driving means 124a, 124b for a number of multi-channel projection systems, i.e. to re-use the removable controlling means of the blending tool for the calibration, adjustment and/or optimization of different multi-channel projection systems. The driving means 124a, 124b being separate from the adjustable optical blending means 110a, 110b furthermore allows to reduce the stress and environmental influence on the adjustable optical blending means, as the adjustable optical blending means 110a, 110b typically will be less in weight and will be made of less different materials.

The engaging means 122a, 122b allowing to removably and temporary, i.e. reversibly, connect the removable controlling means 120, or the driving means 124a, 124b or transferring means 126a, 126b thereof, to the adjustable optical blending means 110a, 110b or the blending components 114a, 114b thereof, may be any suitable engaging means 122a, 122b allowing to transfer the movement to the adjustable optical blending means 110a, 110b or the blending components 114a, 114b via the corresponding engaging means 118a, 118b on the optical blending means 110a, 110b. Preferably, the engaging means 122a, 122b provide this engaging through providing a rotational or translational or a combined rotational and translational movement, like e.g. clipping or clicking, such that no additional tools are needed for the engagement, i.e. connection or disconnection. The engaging means 122a, 122b may be directly coupled to the driving means 124a, 124b such that a transferring means 126a, 126b can be avoided.

The driving means 124a, 124b of the removable controlling means 120 may be driven directly or remotely. In a preferred embodiment, the removable controlling means 120 is adapted to be remotely driven and therefore allows communication between the user of the blending tool and the removable controlling means through a standard protocol. Typical examples may be communication through any of infrared remote control, computer driven control through wireless connection, computer driven control through Ethernet, remote sensing or computer driven control through wired connection. In FIG. 3 a corresponding remote control device 130 is shown, which allows operating the driving means 124a, 124b from a distance. The latter may allow a single person to fully operate the blending tool and to optimally perform the blending calibration and/or adjustment and/or optimization, as the user can perform the calibration and/or adjustment and/or optimization from the viewing side of the projection system.

It also is an advantage of the blending tool according to the present invention that the controlling of the blending means, besides automated, also still can be performed manually, such that in absence of a removable controlling means 120 the system can still be optimized, albeit far less efficiently.

Optionally, the blending tool 100 described in the first embodiment of the present invention may comprise a link (not shown in the drawings) to the projection system or to the image generator such that appropriate test signals can be provided. The use of an appropriate test signal, i.e. test sub-images, allows to obtain an improved blending result. In a more advanced system, optionally a feed-back system (not shown in the drawings) may be provided in the blending tool 100, whereby an optical sensor detects the composite image or part thereof and thus the blending on the screen, and provides feed-back to the removable controlling means 120. This feed-back may be obtained after evaluating the detected optical signal in a computing means. Such evaluating may be based on specific provided algorithms or on neural networking.

Another optional feature of the blending tool 100 according to embodiments of the present invention may be a storing and/or outputting means (not shown in the drawings) for storing and/or outputting the settings of the blending components 114a, 114b obtained after optimizing the blending. The latter can e.g. be performed when encoded motors are used, whereby between the settings of the motors and the settings of the adjustable optical blending means 110a, 110b a one-to-one relation exists. It is especially useful when a channel of a multi-channel projection system needs to be replaced as recalling the settings from a previous optimization routine results in an improved initial setting of the adjustable optical blending means leading to an easier optimization procedure.

In a second embodiment, the present invention also relates to a multi-channel projection system comprising adjustable optical blending means as described in the first embodiment and adapted to be driven using a removable controlling means as described in the first embodiment. These adjustable optical blending means thus has similar components and characteristics as described in the first embodiment. The adjustable optical blending means thus is an essential part of the second embodiment of the invention, whereas the removable controlling means itself is not part of this embodiment of the present invention.

Figure 7:
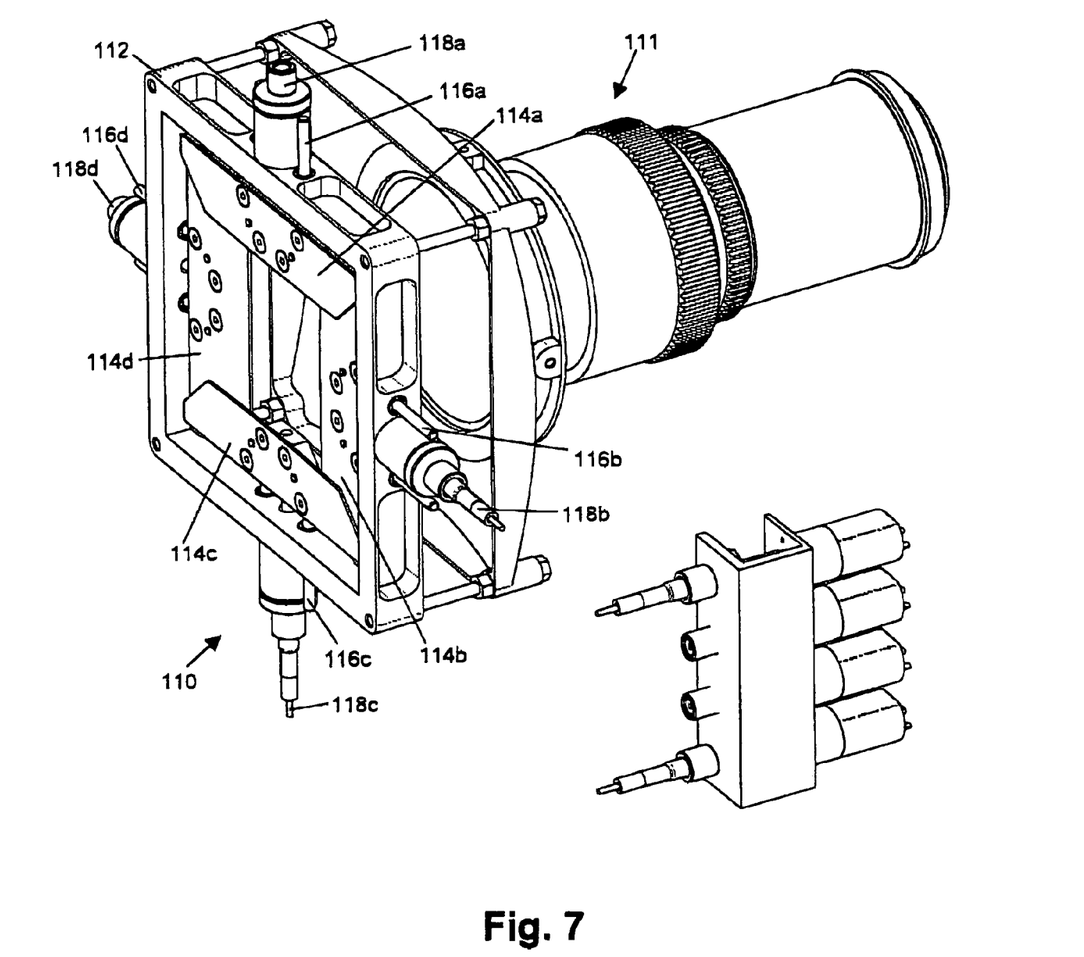
FIG. 7 and FIG. 8 show a perspective respectively side view of a part of a projection system comprising adjustable optical blending means, according to a second embodiment of the present invention.
Figure 8:
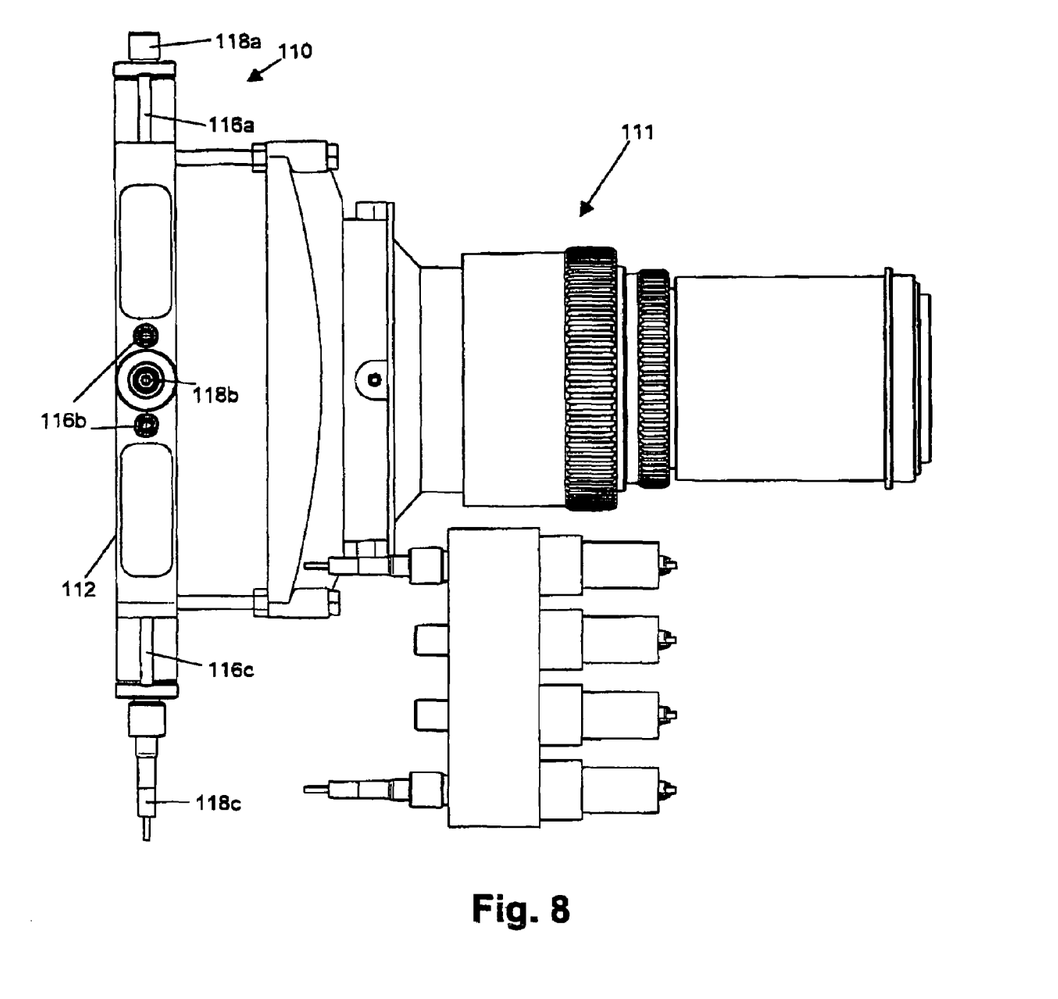
Figure 10A:
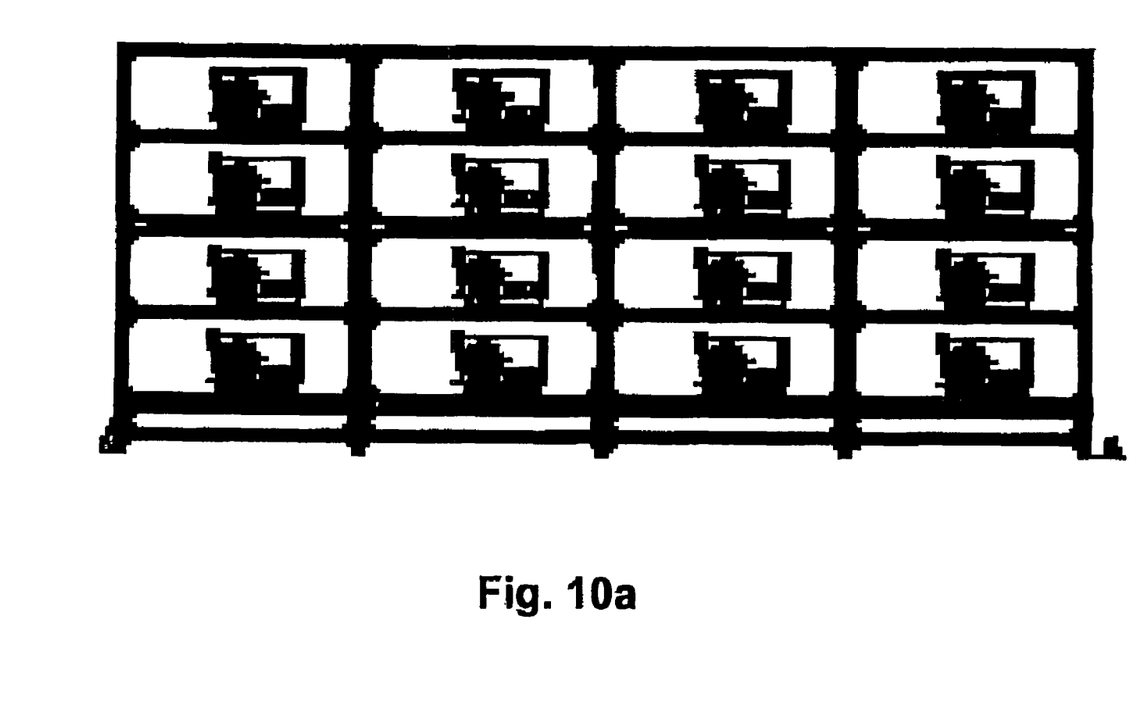
FIG. 10a and FIG. 10b respectively show a front view and a side view of an embodiment of a multi-channel projection system.
Figure 10B:
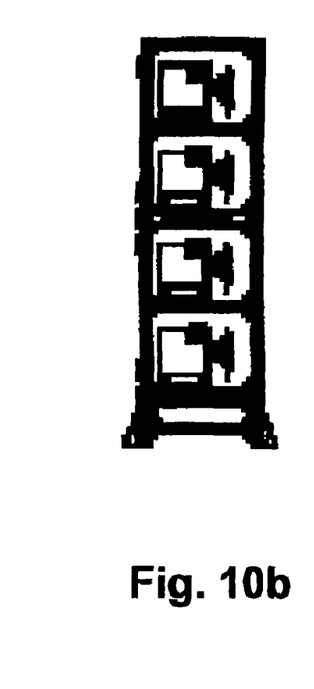

The projection system according to this embodiment of the present invention is a multi-channel projection system whereon for at least one, but preferably for all channels an adjustable optical blending means is mounted. The multi-channel projection system may be a front projection system as well as a rear projection system. The multi-channel projection system, to which the adjustable optical blending means are mounted, may e.g. be a multi-projector projection system. The multi-projector system may consist of m rows by n columns of projectors, i.e. m×n projectors. The multi-channel projection system also may be a stereo multi-channel projection system, then typically comprising 2×m×n projectors. By way of illustration, a perspective view and a side view of a projection lens 111 of such system, provided with an adjustable optical blending means is shown in FIGS. 7 and 8 respectively. The projection system can be any kind of projection system. An embodiment of a front view and a side view of a complete rear-projection multi-channel, e.g. 16-channel, projection system according to the present invention are shown in FIG. 10a and FIG. 10b respectively.

Figure 9:
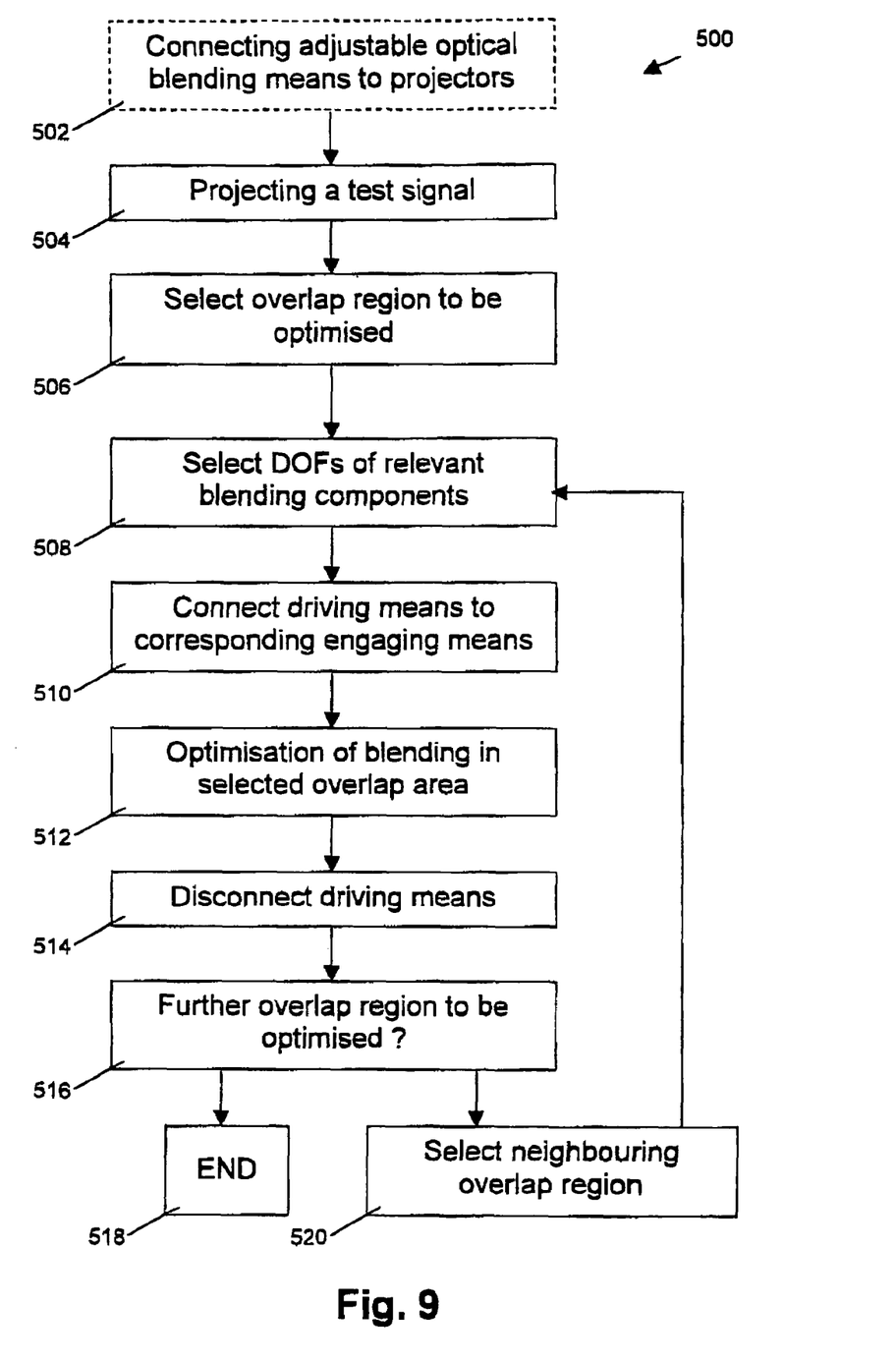
FIG. 9 shows a flow chart of a method for automated blending according to a third embodiment of the present invention.

In a third embodiment, the present invention relates to methods for adjusting the blending in a multi-channel projection system comprising adjustable optical blending means as described in the previous embodiments or suitable for comprising these adjustable optical blending means. In FIG. 9 a flow chart of a method for adjusting the blending of a m×n projection system according to the present invention is shown. Such a method 500 typically comprises the following steps.

Depending on whether the blending means 110a, 110b are already provided, in a first step 502 adjustable optical blending means 110a, 110b as described in the previous embodiments are mounted to each channel of the multi-channel projection system. This step is avoided when the system already comprises such blending means 110a, 110b, e.g. provided during fabrication or during a previous optimization of the blending in the system.

In a second step 504, the method comprises projecting a test signal. Such test signal may be a standard signal output out by the multi-channel projection system, a standard image provided by the image generator coupled to the projection system or a test image provided by an additional test signal providing means which is part of the adjustable controlling means 120 of the blending tool 100 and which is coupled to the projection system or to the image generator thereof. This test signal is a composite image showing the different overlap regions. Although in the method further described the test signal is not altered anymore, in alternative embodiments, the test signal may be altered for optimizing the blending in different regions of the screen.

In a following step 506, an overlap region to be calibrated and/or optimized and/or adjusted in the projected composite image is selected.

The degrees of freedom (DOF) of the blending components 114a, 114b allowing influencing of the overlap region and which have not yet been used for optimizing neighboring overlap regions are then selected, in step 508, and driving means for controlling the blending components along these degrees of freedom are connected, i.e. engaged to the blending components 114a, 114b correspondingly in step 510.

In step 512, the user of the blending tool 100 performs optimization of the blending in the selected overlap area. The latter may be done from the viewing side of the screen, as the blending tool 100 may comprise remote control functions, which allows an easier optimization. The optimization is performed by controlling via the removable controlling means 120, the attenuation of the light in the overlap region along the relevant degrees of freedom of the blending components 114a, 114b of the adjustable optical blending means 110a, 110b. This controlling may e.g. be changing the physical position, i.e. moving, of the blending components, or, in case of selectable filters based on e.g. liquid crystal displays, changing the values of the pixels.

After the blending in the selected overlap region is performed, the removable controlling means 120 is disconnected, i.e. disengaged, from the blending components 114a, 114b in step 514. The latter may be an optional step depending on the number of driving means 124a, 124b that are available in the removable controlling means 120.

In step 516, it is evaluated whether a further overlap region of the composite image needs to be optimized. If neighboring non-optimized overlap regions are still present, a neighboring non-optimized overlap region is selected in a following step 520 and the method returns to step 508. If all overlap regions are optimized, the method ends in step 518.

Optionally, after optimizing of a selected overlap region, the settings of the blending components 114a, 114b used for obtaining this blending may be output or stored, in order to use this information later as a starting value during e.g. maintenance or replacement of a channel of the multi-channel projection system. This allows a more easy maintenance procedure in the future as an improved initial setting of the adjustable optical blending means 110a, 110b can be obtained by recalling the information about the settings obtained during the previous optimization.

The method described above describes—for clarity reasons—only a single optimization step for each overlap region, whereas in reality fine tuning of optimized overlap regions may be performed by re-adjusting degrees of freedom of blending components 114a, 114b that have already been used. Typically such a method for blending may be an iterative process. Alternatively or in addition thereto, further optimization of the blending may be performed using other blending techniques, e.g. by performing electronic blending. Performing electronic blending is well known by a person skilled in the art.

In a further embodiment, the method may be significantly further automated, whereby the controlling is at least partly performed without intervention of the user of the blending tool. A feedback system may be provided comprising an optical detection system, e.g. an optical sensor or a number of optical sensors, that monitors the screen or part thereof and that provides feed-back to the removable controlling system 120. In this way, the interventions by the user could be restricted to connecting and disconnecting the removable controlling means 120 to/from the adjustable optical blending means 110a, 110b or the corresponding blending components 114a, 114b thereof.

While the invention has been shown and described with reference to preferred embodiments, it will be understood by those skilled in the art that various changes or modifications in form and detail may be made without departing from the scope and spirit of this invention.

We claim:

1. A blending device for blending sub-images projected by a plurality of projectors into a larger image, the blending device comprising
a plurality of adjustable optical blending means, each of said adjustable optical blending means adapted to be mounted on a projector of said plurality of projectors,
removable controlling means for automated controlling at least one of said plurality of adjustable optical blending means, said removable controlling means comprising engaging means adapted for temporary engaging with said at least one adjustable optical blending means.

2. A blending device according to claim 1, said removable controlling means adapted for being remotely driven.

3. A blending device according to claim 2, wherein remotely driven comprises any of infrared remote controlled, computer driven through wireless connection, computer driven through Ethernet, remote sensing or computer driven through wired connection.

4. A blending device according to claim 1, wherein each of said adjustable optical blending means comprises at least one blending component.

5. A blending device according to claim 4, wherein each of said at least one blending component is moveable in a plane substantially perpendicular to an optical axis of a projection lens of a projector of said plurality of projectors.

6. A blending device according to claim 4, wherein said removable controlling means for controlling at least one of said plurality of adjustable optical blending means comprises at least one driving means for imparting motion to said at least one blending component of said at least one of said plurality of adjustable blending means, through said engaging means.

7. A blending device according to claim 6, wherein said driving means for imparting motion is any of a DC motor, a stepper motor or an encoded motor.

8. A blending device according to claim 6, wherein said removable controlling means comprises a transferring means for transferring the motion imparted by said driving means to said engaging means.

9. A blending device according to claim 4, wherein said blending device furthermore comprises a feed-back means for providing feed-back to said removable controlling means about said blending obtained by said automated controlling said at least one blending component of said at least one of said plurality of adjustable optical blending means.

10. A blending device according to claim 1, wherein said blending device furthermore is adapted for providing a test signal to said projector or a control signal to an image generator adapted for providing said sub-image to said projector.

11. A blending device according to claim 1, said removable controlling means providing specific positions of said at least one blending component of said at least one of said plurality of adjustable optical blending means, said specific positions characterized by a number of settings, wherein said blending device furthermore is adapted for outputting and/or storing said settings.

12. A blending device according to claim 1, said removable controlling means being adapted for simultaneously engaging with and/or controlling of at least two adjustable optical blending means, said adjustable optical blending means mounted on adjacent projectors.

13. A projection system for projecting a multi-channel image, formed by a plurality of sub-images, the projection system comprising a plurality of projectors, wherein said projection system comprises for each of said plurality of projectors, an adjustable optical blending means mounted on said projector, wherein said adjustable optical blending means is adapted for being automatedly controlled using a removable controlling means adapted for temporary engaging with at least one of said adjustable optical blending means.

14. A projection system according to claim 13, wherein said adjustable optical blending means comprises at least one blending component.

15. A projection system according to claim 14, wherein each of said at least one blending components is movable in a plane substantially perpendicular to an optical axis of a projection lens of the projector onto which the blending means is mounted.

16. A projection system according to claim 13, said projection system furthermore comprising a means for electronically blending said plurality of sub-images.

17. A method for blending sub-images generated by a multi-channel projector system, the method comprising connecting removable controlling means to at least one of a plurality of adjustable optical blending means, each mounted on a corresponding projector, controlling said at least one of a plurality of adjustable optical blending means in an automated way using said removable controlling means so as to blend sub-images of said corresponding projector, removing said removable controlling means from said adjustable optical blending means.

18. A method for blending according to claim 17, wherein said method furthermore comprises, prior to said connecting of the removable controlling means, mounting an adjustable optical blending means to each of a plurality of projectors.

19. A method for blending according to claim 17, said projection system being a rear-projection system providing an image to a rear side of a screen, wherein said controlling comprises remotely controlling said at least one of a plurality of adjustable optical blending means from a viewing side of said screen.

20. A method for blending according to claim 17, wherein said controlling comprises controlling of at least two adjustable optical blending means simultaneously in an automated way.

21. A method for blending according to claim 17, said adjustable optical blending means comprising at least one blending component, wherein said controlling comprises moving at least one blending component in a plane substantially perpendicular to an optical axis of a projection lens of said projector.

22. A method for blending according to claim 17, the method furthermore comprising, providing test sub-images to said projection system.

23. A method for blending according to claim 17, wherein controlling furthermore comprises obtaining feed-back about said blending sub-images of said corresponding projectors.

24. A method for blending according to claim 17, said method furthermore comprising outputting and/or storing settings of said at least one adjustable blending component of at least one of said plurality of adjustable optical blending means obtained during said controlling of said at least one of a plurality of adjustable optical blending means in an automated way.

25. A method for blending according to claim 17, said method furthermore comprising obtaining settings of at least one of said blending components of said at least one of said plurality of adjustable optical blending means and said controlling being controlling based on said obtained settings.

* * * * *